United States Patent
McRae et al.

(10) Patent No.: US 12,275,889 B2
(45) Date of Patent: Apr. 15, 2025

(54) SCALE DEPOSITION INHIBITING SCAVENGER COMPOSITIONS AND THEIR USE

(71) Applicant: Cameron International Corporation, Houston, TX (US)

(72) Inventors: James A. McRae, Houston, TX (US); Suguna Gopal, Dubai (AE); Anand Annamalai, Dubai (AE)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 561 days.

(21) Appl. No.: 17/579,840

(22) Filed: Jan. 20, 2022

(65) Prior Publication Data
US 2022/0213377 A1    Jul. 7, 2022

Related U.S. Application Data

(62) Division of application No. 15/764,824, filed as application No. PCT/IB2015/057482 on Sep. 30, 2015, now Pat. No. 11,261,370.

(51) Int. Cl.
| | |
|---|---|
| *B01D 53/52* | (2006.01) |
| *C02F 1/68* | (2023.01) |
| *C02F 5/12* | (2023.01) |
| *C09K 8/528* | (2006.01) |
| *C02F 103/10* | (2006.01) |

(52) U.S. Cl.
CPC .............. *C09K 8/528* (2013.01); *B01D 53/52* (2013.01); *C02F 1/683* (2013.01); *C02F 5/12* (2013.01); *C02F 2103/10* (2013.01); *C02F 2303/22* (2013.01); *C09K 2208/20* (2013.01)

(58) Field of Classification Search
CPC ...... B01D 53/52; C02F 1/683; C02F 2103/10; C02F 2303/22; C02F 5/12; C09K 2208/20; C09K 8/528
See application file for complete search history.

(56) References Cited

U.S. PATENT DOCUMENTS

| | | | |
|---|---|---|---|
| 5,128,049 A | | 7/1992 | Gatlin |
| 5,510,057 A | * | 4/1996 | Riggs .................... C23F 11/08 252/387 |
| 5,744,024 A | | 4/1998 | Sullivan, III et al. |
| 5,989,322 A | * | 11/1999 | Riggs, Jr. ................ C23F 11/18 106/14.44 |
| 7,264,786 B2 | | 9/2007 | Pakulski et al. |
| 11,261,370 B2 | | 3/2022 | McRae et al. |
| 2004/0096382 A1 | | 5/2004 | Smith et al. |
| 2014/0209510 A1 | * | 7/2014 | Harrington .......... C07C 217/08 208/207 |
| 2015/0037202 A1 | | 2/2015 | Harrington et al. |

FOREIGN PATENT DOCUMENTS

| | | | | |
|---|---|---|---|---|
| CA | 2758686 A1 | * | 5/2013 | ............... C02F 5/10 |
| CN | 103936176 A | * | 7/2014 | |

OTHER PUBLICATIONS

English language machine translation of CN-103936176-A, 6 pages, No Date.*
International Search Report issued in PCT/182015/057482 mailed on Dec. 10, 2015 (3 pages).
Written Opinion of the International Searching Authority issued in PCT/182015/057482 mailed on Dec. 10, 2015 4 pages).
Amjad, et al., "The Use of Polymers to Improve Control of Calcium Carbonate Scaling in High Stressed Cooling Water Systems*—Part I"; the Analyst, The Voice of The Water Treatment Industry, 2004 Annual convention of the Association of Water Technologies, Nashville, TN (10 pages).
Sumestry, et al., "Case Study—Calcium-Carbonate-Scale Inhibitor Performance Degradation Because of H2S-Scavenger Injection in Semoga Field"; Oil and Gas Facilities, Feb. 2013, pp. 40-45 (6 pages).
Jan M. Bakke et al, Hydrolysis of 1,3,5-Tris(2-hydroxyethyl)hexahydro-s-triazine and Its Reaction with H2S, Ind. Eng. Chem. Res. 2001, 40, 6051-6054. (Year: 2001).

* cited by examiner

Primary Examiner — Pranav N Patel
(74) Attorney, Agent, or Firm — Jeffrey D. Frantz

(57) ABSTRACT

A method of treating a fluid to reduce the level of $H_2S$ therein while inhibiting the deposition of scale on surfaces in contact with the fluid, comprising introducing into the fluid a triazine scavenger compound and a terpolymer. The fluid may be liquid or gas and may be petroleum, petroleum product, natural gas, liquefied petroleum gas or other type of oil fraction or refined oil. The triazine scavenger may be e.g. 1,3,5-tri(2-hydroxyethyl)-hexahydro-1,3,5-triazine.
The terpolymer may comprise a carboxylate/sulphonate/non-ionic terpolymer. When added to a wellbore fluid, it is effective as a scavenger of $H_2S$ and also reduces the amount of scale deposition on a surface in contact with the fluid when the fluid comes into contact with or is mixed with a brine. In some aspects, the composition increases the proportion of precipitated solids held in suspension when the fluid is contacted with or mixed with a brine.

8 Claims, No Drawings

SCALE DEPOSITION INHIBITING SCAVENGER COMPOSITIONS AND THEIR USE

This invention has to do with methods and compositions for the treatment of fluids to remove or reduce levels of hydrogen sulphide and reduce or eliminate deposition of scale on surfaces in contact with the fluid.

BACKGROUND

In the oil and gas industries, fluid bodies and fluid streams are often treated with scavengers to remove hydrogen sulfide ($H_2S$). $H_2S$ is often present in processes involving the recovery, production or handling of hydrocarbons such as petroleum, petroleum gas and their derivatives. The $H_2S$ may be present not only in or above the hydrocarbon fluid but also in associated water, e.g. in sea water or underground water mixed with the hydrocarbon.

The acidity and toxicity of $H_2S$ necessitate its reduction to low levels. To remove it, various processes are known and one of these is to treat the fluid or fluids concerned with a scavenger substance which reacts selectively with the $H_2S$. A wide range of scavenger compounds is known for this purpose. One group of compounds of established effectiveness is the 1,3,5-tri-substituted hexahydrotriazines. The use of such triazine scavengers is disclosed in for example U.S. Pat. Nos. 5,128,049 and 5,744,024.

Many of the compositions used as $H_2S$ scavengers are alkaline compounds and, as such, increase the pH of the fluid body to which they are added. During oilfield operations, drilling fluids often come into contact with brines containing high concentrations of calcium and/or barium ions in solution. When the pH of a fluid body is raised by addition of typical $H_2S$ scavengers, and also depending on system pressure, temperature, and ionic concentration, the calcium and barium ions have increased tendency to form solid deposits such as carbonates or sulphates, also known as "scale", on surfaces contacting the fluid body. Over time, this scale deposition can impair performance of oilfield apparatus, e.g. by occluding conduits, seizing moving parts etc., requiring shut down to remove the scale deposits. Therefore, the use of scale inhibitor compositions in oilfield operations is known.

Elevation of the pH of the fluid body due to addition of a scavenger composition can in fact cause an increased propensity for scale deposition, particularly in the presence of high calcium/barium brines. This in turn leads to an increase in the amount of scale inhibitor composition required to attempt to control the scale deposition. Apart from the increased cost implications of using larger amounts of scale inhibitors, these inhibitors tend to aim to reduce pH of the fluid body to reduce the scale precipitation. However, the reduction of pH also reduces the effectiveness of the $H_2S$ scavenger components. Therefore many of the typical scavengers and scale inhibitors tend to work against each other, at least in terms of their effect on the pH of the fluid body to which they are added.

U.S. Pat. No. 7,264,786 describes scavenging, especially for mercaptans in addition to $H_2S$, using triazine derivatives substituted with tertiary amino groups, morpholines, piperazines, alkanolamines, amine oxides or polyamines.

SUMMARY OF THE INVENTION

An aim herein is to provide new and useful methods and compositions for scavenging $H_2S$ from fluid bodies or fluid streams, such as those mentioned above, using a triazine scavenger while also inhibiting the deposition of scale on surfaces in contact with the fluid stream. A particular aspect is to combine the triazine scavenger with an auxiliary substance to reduce the deposition of scale, such as calcium or barium carbonate or sulphate on contact of the fluid with calcium or barium brine. A further aspect is to combine the triazine scavenger with an auxiliary substance to increase the proportion of solid (e.g. carbonate or sulphate) precipitate that is held in suspension in the fluid as opposed to depositing as scale on surfaces that are in contact with the fluid, optionally at the same time reducing the overall amount of solid precipitate (e.g. carbonate or sulphate) that is precipitated on contact or mixing of the fluid with a brine.

A further object or aspect of the present disclosure is the provision of a composition comprising a triazine scavenger in admixture with a said auxiliary substance, preferably as a compatible (miscible) mixture, which can be introduced or injected as a mixture into the fluid to be treated to provide a convenient process with an appropriate predetermined ratio of the scavenger and auxiliary substance.

Terpolymers, particularly terpolymers comprising carboxylate groups and sulphonate groups used as the auxiliary substance in combination with triazine scavengers, can reduce the propensity for scale deposition on surfaces in contact with the fluid while generally maintaining the scavenger effectiveness in removing $H_2S$. A synergistic effect may be achieved. Moreover said terpolymers have been found to also be compatible or miscible with the triazine scavenger, especially in aqueous preparations or conditions, so that a corresponding mixture can be conveniently stored and used without difficulties of settling or separation.

Thus, a first aspect of the disclosure provides a method of treating a fluid to reduce the level of $H_2S$ therein, comprising introducing into the fluid a triazine $H_2S$ scavenger compound and a terpolymer (as defined herein) comprising one or more carboxylate groups and one or more sulphonate groups. The terpolymer can be effective to reduce the amount of scale deposited on surfaces in contact with the fluid when contacted with (i.e. mixed with) an aqueous brine, preferably synergistically with the action of the triazine scavenger. Preferably the terpolymer is effective to increase the proportion of solids, that precipitate when the fluid contacts or mixes with a brine, that are held in suspension in the fluid rather than depositing on surfaces that are in contact with the fluid. This increase is as compared to an equivalent composition that does not contain the terpolymer component.

The scavenger composition comprising a triazine component as defined herein and a terpolymer as defined herein may also preferably show compatibility with polyacrylamide-containing fluids. In some oilfield applications polyacrylamide is used as a component of a wellbore fluid to enhance oil production. Therefore it is desirable for the scavenger composition to be compatible with these wellbore fluids.

A further aspect is the use of a terpolymer as defined herein to reduce the amount of scale deposited on surfaces in contact with the fluid when it is contacted with an aqueous brine, in a method in which the $H_2S$ scavenger and terpolymer (as defined herein) are introduced into a fluid in which the $H_2S$ content is to be reduced.

A further aspect is a composition comprising a triazine $H_1S$ scavenger in combination with a terpolymer component as defined herein. In preferred embodiments the terpolymer and triazine derivative are fully miscible in the mixture. Desirably the mixture is a fully-miscible aqueous preparation, such as a clear solution.

Particularly useful aspects include application of the methods, uses, and compositions described herein in wellbore applications.

DETAILED DESCRIPTION; OPTIONS, AND PREFERENCES

In the methods of the present disclosure, the combination of triazine scavenger and terpolymer is brought into contact with, e.g. mixed with, a body of liquid and/or gas containing hydrogen sulfide to be reduced or removed. The liquid or gas body may be a static body or a flowing stream. It may comprise or consist of petroleum, petroleum product, natural gas, liquefied petroleum gas or other type of oil fraction or refined oil. Moreover the fluid body or stream may comprise water, such as underground water such as sea water or other brine involved in a hydrocarbon recovery process such as oil drilling.

The point at which the scavenger combination is introduced into the fluid may be determined in accordance with conventional practice. While the combined, in some cases synergistic, effects of $H_2S$ reduction and reduced scale deposition may still be achieved by introducing the triazine scavenger and the terpolymer component separately, it is preferred to use and introduce them as a mixture as described herein.

In the methods and compositions described herein, the discussion of "scale" is distinct from solids precipitated from a brine solution. As described herein, scale is a precipitate (often insoluble carbonate and/or sulphate) that is specifically deposited and often immobilised on a surface that is in contact with the fluid/brine mixture, whereas discussion of a precipitate has the usual, more general meaning of any solid component that is precipitated out of solution. Specifically, as defined herein, "scale" does not include solid precipitate that is held in suspension in the fluid.

With reference to the methods and compositions described herein, the discussion of reduction of scale is typically a discussion of the behaviour of a fluid containing the composition as disclosed herein when the fluid comes into contact with or mixes with a brine, typically a brine comprising one or more of calcium and barium ions in solution. The reduction of scale may refer to an overall reduction in the amount of solid that precipitates from the fluid/brine mixture. For example, this amount of solid may be lower than in an equivalent fluid/brine mixture that does not contain the scavenger composition as described herein. The reduction of scale may additionally or alternatively refer to an increase in the amount or proportion of solid precipitate that is held in suspension as compared to the amount or proportion that is deposited as scale on a surface that is in contact with the fluid/brine mixture. Again, this may be in comparison with an equivalent fluid/brine mixture that does not contain the scavenger composition as described herein.

Preferably the reduction of scale refers to an increase in the amount of solid precipitate that is held in suspension as compared to the amount that is deposited as scale on a surface that is in contact with the fluid/brine mixture, hence the amount of "scale" deposited on the surface is reduced (as compared to an equivalent fluid/brine mixture that does not contain the scavenger composition as described herein). This effective reduction in deposited scale is beneficial because the action of the scavenger composition to hold the solid precipitate in suspension means that the system is tolerant of an increase in the overall amount of deposited solid without any increase in the amount of deposited scale (i.e. the solids deposited on surfaces in contact with the fluid). Furthermore, any precipitate that is held in suspension does not typically impede the flow of the fluid or form deposits to impair function of wellbore components. A suspended precipitate may be held in suspension and flow in the fluid to an appropriate area where it can be removed, e.g. by filtration or centrifugation.

A level of scaling may be determined using a known standard static jar technique. In this technique, two solutions are prepared containing scale anions and scale cations respectively. These solutions are then combined and the resulting scale deposition observed. Observation may be by visual assessment of the amount of precipitation or scale formation. This type of testing typically continues for up to 24 hours. The levels of specific species remaining in solution following any precipitation or scaling can be measured by filtering out the solid component and testing the filtrate, e.g. by Inductively Coupled Plasma Mass Spectrometry (ICP). Scale inhibitors may be tested by adding them to one of the cation or anion solution prior to combination.

A percentage scale inhibition value may be determined by comparison of levels of scale ions (e.g. $Ca^{2+}$ or $Ba^{2+}$) in a reference solution that does not contain a scale inhibitor/triazine composition with the levels in a test solution containing such an inhibitor/triazine composition. The percentage of scale ions remaining in solution as compared to the reference sample gives an indication of the level of scale inhibition. The present compositions preferably show inhibition of $Ca^{2+}$ and $Ba^{2+}$ scales of at least 85%, preferably at least 90%, preferably at least 95%, preferably at least 99%.

A brine may refer to any aqueous fluid comprising dissolved inorganic salts; for example seawater, or solutions comprising dissolved inorganic ions. In particular, brines containing one or more of dissolved calcium ions ($Ca^{2+}$) and dissolved barium ions ($Ba^{2+}$) are particularly prone to precipitation of solid calcium and barium inorganic salts (especially carbonates) when contacted with fluids containing scavenger compositions, especially alkaline scavenger compositions.

The type of triazine scavenger is not necessarily limited. Triazine scavengers are well known, and the skilled person can choose in accordance with existing knowledge. Typically they are compounds of the formula

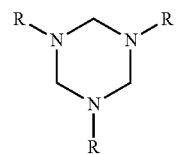

wherein each R is a substituted or unsubstituted hydrocarbon radical, preferably selected from $C_{1-6}$ hydrocarbon (preferably $C_{1-4}$ hydrocarbon, preferably $C_{1-6}$ or $C_{1-4}$ alkyl, more preferably methyl or ethyl;

$C_{1-6}$ hydroxy-substituted or amino-substituted alkyl, preferably —$CH_2CH_2OH$;

alkoxy-substituted hydrocarbon, preferably with $C_{1-6}$ alkoxy substituted on $C_{1-6}$ alkyl.

Preferably all three R groups are the same, since such compounds are readily synthesised and commercially available. Particularly preferred compounds are those in which R is —$CH_2CH_2OH$ or —$CH_3$.

Most preferably the triazine scavenger is 1,3,5-tri(2-hydroxyethyl)-hexahydro-1,3,5-triazine.

These compounds are commercially available, either substantially pure or as solutions, and especially aqueous solutions are convenient and preferred, e.g. at 30 to 80 wt. % concentration of the triazine.

The suitable terpolymer component may be selected from various terpolymers. Preferably the terpolymers used in the present compositions comprise one or more ionic groups, preferably anionic groups. Overall, the terpolymer is preferably negatively charged. Preferably the terpolymers used in the present compositions contain one or more carboxylate groups and one or more sulphonate groups. The terpolymer may further comprise a non-ionic component which, in preferred compositions, is sterically bulky.

In some cases the terpolymer is formed from a sulphonated copolymer backbone in which at least one of the backbone components comprises carboxylate functional groups. The monomer components of the copolymer backbone may, in some cases, be selected from acrylic acid, maleic acid, ethyl acrylate, 2-acrylamido-2-methyl propane sulfonic acid and its sodium salt, methylene phosphonic acids and their salt derivatives, esters of poly-carboxylic acid, mono- or di-methacrylates, vinyl phosphonic acids, vinyl acrylamides, vinyl formamide, and epoxy succinic acid. In some cases the terpolymer backbone is a copolymer formed from acrylic acid and maleic acid, optionally with a proportion of these monomers substituted for ethyl acrylate and/or an amide group. The terpolymer preferably further contains a carbonyl monomer compound as the non-ionic component. This carbonyl compound is preferably selected from the group of aromatic or aliphatic aldehydes or ketones. These are preferably selected to maintain good water solubility of the terpolymer.

Preferably the terpolymer used in the present compositions is one or more terpolymers selected from the group of carboxylate/sulphonate/non-ionic terpolymers. In these terpolymers, the carboxylate groups may be attracted to the surface of precipitated particles and may be effective to allow the terpolymer to adsorb onto the particles. The sulphonate groups may be only weakly attracted to the surface of the particles and so retain some negative charge that may be effective to provide repulsion and prevent or reduce the tendency for aggregation into larger particles (which could subsequently settle and form scale deposits). The non-ionic groups enhance dispersion of the particles and may be effective to provide steric bulk and enhance repulsive forces between particles.

Preferably the terpolymer has a molecular weight above about 2500, preferably above about 3000, preferably above about 3500, preferably above about 4000, preferably about 4500, in some cases up to 8000 or above.

In some aspects, the terpolymer component is selected from commercially available carboxylate/sulfonate/non-ionic functional terpolymers, for example terpolymers from the Acumer™ range from Rohm and Haas or the Maxinol range from Aquapharm Chemicals Pvt. Limited. In preferred cases the terpolymer component is one or more selected from "Acumer™ 3100" from Rohm and Haas, "Maxinol 5400" from Aquapharm Chemicals Pvt. Limited, "TH-3100" from Shandong Taihe Water Treatment Technologies Co. Ltd. In preferred aspects, the terpolymer component is selected from one or more of the carboxylate/sulfonate/non-ionic functional terpolymers "Acumer™ 3100" and "Maxinol 5400".

Preferred terpolymers are liquid at room temperature (20° C.). Usually the preferred terpolymers are fully water-soluble at 20° C., more preferably at 15° C., 10° C. or 5° C., up to at least 10 wt. concentration. Moreover the mixture or composition disclosed herein is desirably stable i.e. without separation of the amine oxide or triazine, at 15° C., more preferably at 10° C., more preferably at 5° C. This is of practical importance in providing a mixture that is compositionally stable even after storage or delivery under cold conditions.

In terms of the combination of the triazine scavenger and terpolymer components, desirably the terpolymer is used in an amount of at least 1 wt. % in the mixture with the triazine component, preferably at least 2 wt. %, preferably at least 2.5 wt. %, preferably at least 3, or at least 4, or at least 5, or at least 7.5, or at least 10 wt. %. Preferably the terpolymer component is present in mixture with the triazine scavenger at between 2 and 20 wt. %, preferably between 2 and 15 wt. %, preferably between 2 and 10 wt. %, preferably between 5 and 10 wt. %.

These proportions also apply when the two components are present in a mixture. Upper and lower limits are of course independent, having distinct technical criteria.

The mixture may sometimes consist effectively of only the mentioned active ingredients, but usually it comprises one or more additional solvents. Preferably the solvent is or includes water. It may be a mixture of water and water-miscible organic solvent, e.g. $C_{1-4}$ alcohol. This solvent component of the mixture may derive from solvent present in one or both of the triazine and terpolymer compositions as originally supplied. Or, additional solvent may be added to facilitate formation of a fully dissolved mixture, or to facilitate introduction of the mixture into the system to be treated.

Compositions for high temperature (e.g. above about 200° C. or even above 250° C.) applications may further contain an inorganic binder, e.g. silica, to stabilise the composition at the high operating temperatures. This may be particularly beneficial in high temperature drilling operations.

Desirably the mixture is a clear solution at 25° C. It is preferable to use terpolymers which are effective to reduce the level of scale deposition when the fluid is contacted with (e.g. mixed with) a brine and which allow the effectiveness of the scavenger component to be maintained to a large degree can be selected to be fully miscible in a clear solution with relevant triazine compounds, leading to great convenience in handling the mixture and in ensuring that it is deployed with the intended ratio between the triazine and terpolymer components.

It will be appreciated that the method may use and the mixture may contain more than one different terpolymer compound and/or more than one different triazine compound, within the principles of the present disclosure. However in many cases a mixture of a single one of each is effective, and convenient to prepare.

According to the nature of the fluid to be treated with the scavenger combination, and the type of apparatus or apparatus stage in which the scavenger treatment is to be carried out, one or more additional components may be administered at the same time and/or included in the mixture according to the disclosure. This may be for example a corrosion inhibitor or the like, subject to effectiveness and compatibility in the system.

In general, routine testing at room temperature can readily confirm the mutual compatibility of the contemplated triazine and terpolymer components and any other components/solvents intended to be combined. A room temperature test is usually valid because one virtue of the compatible mixture is the predetermined ratio of the main components, and this advantage can be exploited provided that the mixture components remain fully mixed (in solution) at least up until they enter the fluid system for reaction. However a more stringent test e.g. at 10° C. or 5° C. may be applied.

As regards the overall amount to be used for the scavenging treatment, the skilled person can follow conventional practice regarding the triazine compound used. A typical amount is in the range from 1 or 2 to 50 ppm of triazine per 1 ppm of $H_2S$, e.g. 20 ppm of triazine per 1 ppm of $H_2S$.

DESCRIPTION OF PREFERRED EMBODIMENTS

Terpolymer scale inhibitors and comparative phosphonate-based scale inhibitors were tested to assess their compatibility and their ability to maintain $H_2S$-scavenging effect of a triazine scavenger while reducing the level of scale deposition on contact with an aqueous brine.

Experimental Procedure

The triazine scavenger used was 1,3,5-tri(2-hydroxyethyl)-hexahydro-1,3,5-triazine, provided as a 50% aqueous solution (HR-2510 from MI Swaco). The test procedure assessed levels of scale precipitation in the scavenger combinations in a brine composition in static vessels in a laboratory.

The test scale inhibitors are commercial products, provided as compositions including a diluent. In the experiments the triazine solution: (scale inhibitor composition) ratio (by weight) was as set out in table 1 below. The test scale inhibitors were the following.

Terpolymer 1

Carboxylate/sulfonate/non-ionic functional terpolymer ("Acumer™ 3100" from Rohm and Haas, average Mw 4500) neutralised with 0.13 g NaOH (100%) per g of Acumer™ 3100.

Terpolymer 2

Carboxylate/sulfonate/non-ionic functional terpolymer ("Maxinol 5400" from Aquapharm Chemicals Pvt. Limited).

Phosphonate 1

Hydroxyethylamino bis (methylene Phosphonic acid)— HEMPA ("Cublen R-60" from Zschimmer & Schwarz Inc.).

Antiscale 1

Carboxylic acid base polymer ("Bellasol S-30" from BWA Water Additives) known as an effective oilfield scale inhibitor.

EXAMPLES AND COMPARATIVE EXAMPLES

The following examples and comparative examples illustrate the present invention and are not intended to limit the scope of the invention or the disclosure in any way.

Example 1—Static Jar Test

Table 1 shows various example formulations A-C and comparative formulations D and E. All formulations showed at least 55% triazine activity.

TABLE 1

| Component | Composition | | | | |
|---|---|---|---|---|---|
| | A | B | C | D | E |
| Triazine scavenger | 95 | 90 | 95 | 90 | 95 |
| Terpolymer 1 | 5 | 10 | | | |
| Terpolymer 2 | | | 5 | | |
| Phosphonate 1 | | | | 10 | |
| Antiscale 1 | | | | | 5 |

The determination of the efficiency of scale inhibition, for the control of carbonate and/or sulphate scaling, was performed by a static jar technique at ambient pressure.

Visual observations and determination of the level of scale was made after 1, 2, 4 and 24 hours. Observations included visual observations of scale formed, and analysis of the scaling ions using Inductively Coupled Plasma Mass Spectrometry (ICP).

A static scale jar test gives an indication (at atmospheric pressure) of the minimum scale inhibitor concentration (MIC) required to prevent scaling, by observation of the degree of scale formed both with and without scale inhibitor. In order to achieve controlled scaling, the scaling test brine composition was prepared as two non-scaling brines (one containing the scaling cations and the other the scaling anions). When the two are mixed together in a 50:50 ratio the resulting fluid has the required (scaling) composition and scale starts to deposit. The point of mixing of the two brines is then taken as the start of the test.

The test brine composition was as set out in table 2 below.

TABLE 2

| Chloride | 3615.000 mg/l |
|---|---|
| Sulphate | 63.000 mg/l |
| Barium | 16.900 mg/l |
| Calcium | 360.500 mg/l |
| Strontium | 5.200 mg/l |
| Magnesium | 91.200 mg/l |
| Sodium | 2309.000 mg/l |
| Potassium | 210.100 mg/l |
| Bicarbonate | 1500.000 mg/l |

Cation and anion brines were prepared as above and scale inhibitors according as set out in table 1 above were added to the cation brine at twice the target concentration to give the target concentration of 1500 ppm of the scavenger/scale inhibitor composition on mixing with the anion brine. The brine was then heated to test temperature (80° C.). Once at temperature the anion and cation brines were mixed in a 50:50 ratio and the test jar (100 ml) kept at test temperature for the duration of the test. At regular intervals observations were made of the appearance of the fluids.

The results of the visual observations are provided in table 3 below wherein:
0=Clear, no precipitate
1=Slight haze, slight precipitate
2=Hazy, moderate precipitate
3=Cloudy, heavy precipitate

TABLE 3

| Composition | Time after test start (hours) | | | |
|---|---|---|---|---|
| | 1 | 2 | 4 | 24 |
| A | 0 | 0 | 1 | 1 |
| B | 0 | 0 | 0 | 1 |
| C | 0 | 0 | 1 | 1 |
| D | 0 | 0 | 1 | 1 |
| E | 1 | 1 | 3 | 3 |

Example 2

A static jar test was undertaken using the protocol as set out in Example 1 but using test fluid taken from an oilfield site. The test fluid already contained some scale inhibitor component so a comparative test with no addition of the composition of the present invention was also undertaken. The following tests were undertaken.

1. Oilfield fluid (Blank-1)
2. Oilfield fluid+1500 ppm triazine scavenger (Blank-2)
3. Oilfield fluid+1500 ppm composition A (table 1 above)
4. Oilfield fluid+1500 ppm composition B (table 1 above)
5. Oilfield fluid+1500 ppm composition C (table 1 above)
6. Oilfield fluid+1500 ppm composition D (table 1 above)

Analysis was by visual observation as in Example 1 and also by ICP analysis of the scale deposit. Visual results are shown in table 4 below, wherein:

0=Clear Water—No Scaling
1=Hazy water
2=Scaling
3=Thick Precipitation at the bottom.

TABLE 4

| Test number | Time after test start (hours) | | | |
| --- | --- | --- | --- | --- |
| | 0 | 2 | 4 | 24 |
| 1 | 0 | 0 | 0 | 1 |
| 2 | 0 | 1 | 2 | 3 |
| 3 | 0 | 0 | 0 | 1 |
| 4 | 0 | 0 | 0 | 1 |
| 5 | 0 | 0 | 0 | 1 |
| 6 | 0 | 0 | 0 | 2 |

The test solutions were filtered and elemental analysis of the filtrate was undertaken by ICP. % scale inhibition values were calculated by comparison with the initial fluid composition. Results are presented in tables 5 and 6 below.

TABLE 5

| Test number | Calcium as $Ca^{2+}$ in filtrate | % scale inhibition |
| --- | --- | --- |
| 1 | 303.2 | — |
| 2 | 85.63 | — |
| 3 | 299.2 | 99 |
| 4 | 305.4 | 100 |
| 5 | 270.1 | 90 |
| 6 | 227.1 | 75 |

TABLE 6

| Test number | Calcium as $Ba^{2+}$ in filtrate | % scale inhibition |
| --- | --- | --- |
| 1 | 11.27 | — |
| 2 | 3.93 | — |
| 3 | 11.16 | 99.02 |
| 4 | 11.21 | 99.50 |

TABLE 6-continued

| Test number | Calcium as $Ba^{2+}$ in filtrate | % scale inhibition |
| --- | --- | --- |
| 5 | 10.13 | 90 |
| 6 | 9.3 | 83 |

Compositions A, B and C (test numbers 3, 4, and 5 respectively in tables 4-6) use carboxylate/sulphonate/non-ionic terpolymers whereas the comparative example composition D (test number 6 in tables 4-6) is a phosphonate-based inhibitor. The results in table 4 indicate that compositions A, B, and C keep any precipitated solids in suspension in the fluid (the observation of a hazy test sample confirms this) whereas a scaling is observed when composition D is tested under the same conditions.

The ICP analysis of the filtrate following testing indicates that compositions A-C show an improved performance in terms of inhibition of deposition of calcium and barium solids as compared to composition D.

Accordingly, the present invention provides a useful and unexpectedly effective addition to the range of means available to the skilled person for reducing hydrogen sulfide using a scavenger process.

All documents disclosed herein are incorporated by reference in their entirety for all purposes.

The invention claimed is:

1. A scavenger composition comprising a mixture of 5-10 wt % triazine $H_2S$ scavenger with greater than 90 wt % of a terpolymer, wherein the terpolymer comprises a carboxylate group, a sulfonate group, and a non-ionic aromatic ketone or aldehyde.

2. The scavenger composition of claim 1, wherein the triazine $H_2S$ scavenger is a compound of the formula:

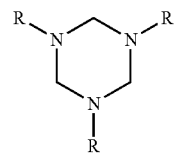

wherein each R is selected from the group consisting of $C_{1-4}$ hydrocarbon radicals, $C_{1-6}$ hydroxy-substituted or amino-substituted alkyls, or alkoxy-substituted hydrocarbon radicals.

3. The scavenger composition of claim 2, wherein R is —CH2CH2OH or —CH3.

4. The scavenger composition of claim 1, wherein the terpolymer comprises one or more anionic groups.

5. The scavenger composition of claim 1, wherein the terpolymer comprises one or more carboxylate groups and one or more sulphonate groups.

6. The scavenger composition of claim 1, wherein the terpolymer has a backbone formed from acrylic acid or maleic acid.

7. The scavenger composition of claim 1, wherein the terpolymer has a backbone formed from acrylic acid and maleic acid.

8. The scavenger composition of claim 1, wherein the terpolymer has a backbone formed from ethyl acrylate.

* * * * *